Nov. 17, 1964   H. T. DRAUDT   3,157,443
BEARING RETAINER
Filed May 18, 1962

INVENTOR.
HERBERT T. DRAUDT
BY
ATTORNEYS

United States Patent Office 3,157,443
Patented Nov. 17, 1964

3,157,443
BEARING RETAINER
Herbert T. Drandt, 3612 Clague Road,
North Olmsted, Ohio
Filed May 18, 1962, Ser. No. 195,902
2 Claims. (Cl. 308—201)

This invention relates to retainers for ball bearings and the like, and more particularly to new and improved molded plastic retainers for anti-friction bearings.

An object of my invention is to provide an improved molded plastic retainer for ball bearings which positively and effectively holds and spaces the balls, yet is formed in a simple two-piece die having no moving parts except the ejecter pins. Another object is to provide a ball bearing retainer that will increase the number of balls that can be employed per unit of circumferential length of a bearing.

Further objects of this invention include the provision of new and improved molded plastic retainers for ball bearings and the like having a generally cylindrical exterior form and having pockets which positively hold and space the balls; which is economically manufactured and used; which is simple and efficient in operation; which positively holds, and without friction retains, the balls in proper spaced relationship in their bearing for their best normal and intended function and operation therein; which comprises a single unitary structure; and in which the ball retaining pockets are formed on fixed die parts and the ring is removable therefrom without deleterious effect on the ring or die and without requiring any moving die parts except ejector pins. Another object is to provide a yielding retainer wherein the balls may be easily inserted in, and removed from, the pockets thereof without deleterious effect on the retainer or the balls, and wherein the balls are held effectively against accidental or premature release from or displacement in the retainer during the use and operation of the bearing in which the balls are employed.

These and other objects and advantages of my invention will appear from the following description of a preferred form thereof, reference being had to the drawings in which.

Figure 1:
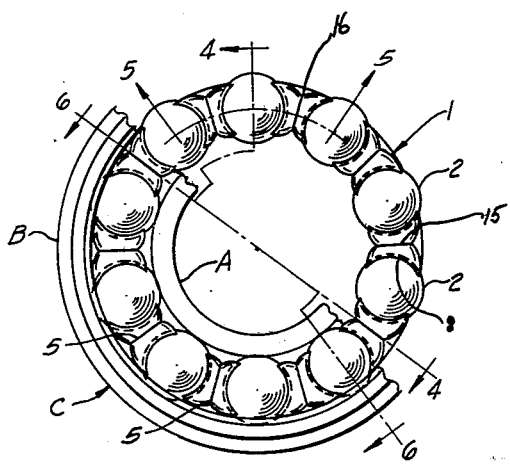
FIGURE 1 is a top plan view of a ball bearing having a retainer embodying a preferred form of my invention, with the balls in place in the pockets of the retainer and with the bearing races partly broken away.
Figure 5:
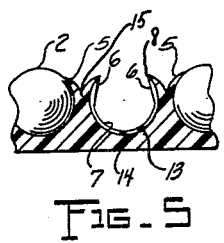
Figure 6:
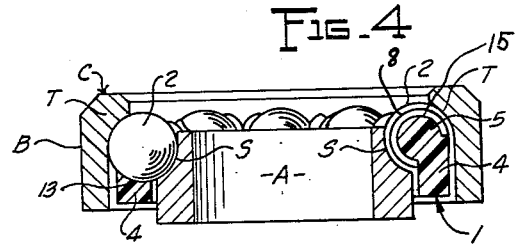

FIGURE 5 is a fragmentary, longitudinal section viewed along the arc 5—5 of FIG. 1, with one of the balls removed, and FIGURE 6 is a longitudinal section with the axis vertical and viewed along the broken offset line 6—6 of FIG. 1, showing, however, the middle balls and dividers as if the line 6—6 were straight and diametrical.

Broadly, my invention provides a retainer for ball bearings comprising a unitary molded, low-friction, resilient plastic structure having a generally circular form with pockets. The retainer can be molded on simple dies with balls with the respective bearing races. The retainer comprises a lower, as viewed in FIGS. 5 and 6, ring and integral, upwardly extending, circumferentially spaced, resiliently yieldable dividers which define intermediate pockets. The retainer can be molded on simple dies with the pockets formed on fixed male parts a little larger but otherwise equal to the retained balls and may be removed therefrom by displacement in a direction parallel with the axis of the retainer without deleterious effect on the ring, retainer, dividers or die. This also provides for selective insertion of the balls into the pockets and removal thereof from the pockets while ensuring that the balls are effectively held against accidental release or displacement from the pockets during normal use.

Figure 2:
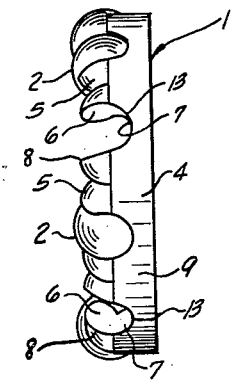
FIGURE 2 is a side view of the retainer shown in FIGURE 1 with its axis turned to the horizontal and with certain of the balls removed for better illustration of the ball receiving pockets and dividers.
Figure 3:
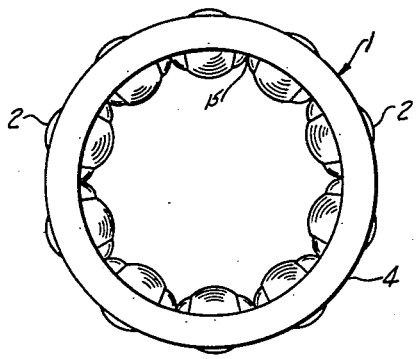
FIGURE 3 is a bottom plan view of the retainer shown in FIGURES 1 and 2 with, however, all the balls retained.

A retainer embodying my invention is indicated generally at 1, and the balls 2 are supported and spaced in what for convenience, I will call the upper part thereof. Retainer 1 has a generally circular annular form and comprises an annular base or ring portion 4, see FIGS. 2, 3 and 4, which carries and is integrally formed with the yieldable dividers 5 that separate and define the pockets 7 within which the balls are removably and movably contained.

Figure 4:
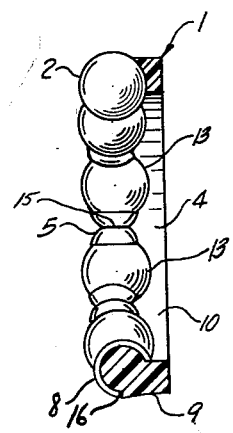
FIGURE 4 is a longitudinal section with the axis turned horizontally and viewed along the broken offset line 4—4 of FIG. 1, showing the middle balls and dividers as if the line 4—4 were straight and diametrical.

Ring 4 preferably has approximately cylindrical outer and inner surfaces 9 and 10, respectively, FIGS. 4 and 6, above which rise the inwardly inclined dividers 5 which present oppositely facing, circumferentially aligned, and juxtaposed spherical, ball-engaging surfaces 6, the exposed peripheral edges of which are circular and struck from centers which lie in the circle described by the centers of the balls 2. Retainer 1 as used in a bearing is disposed between the inner and outer races A and B, respectively, of the bearing C, FIGS. 1 and 6, and is adapted to be supported in spaced relation to both races by the balls 2 which it carries. Accordingly, the outer diameter of the wall 9 and the outer diameter of the whole retainer 1, including the dividers 5, is less than the inside diameter of the adjacent portion of the outer race B within which the retainer is disposed in the assembled bearing C. Similarly, the inside diameter of the inner wall 10 is greater than the outside diameter of the lower adjacent portion of the inner race A, FIG. 6, about which the retainer is disposed in the assembled bearing. As shown in FIG. 6 the innermost, uppermost and outermost parts of the dividers 5 are spaced from the respectively adjacent torus surfaces S and T of the races A and B respectively. Ring 4 has a "bottom" end wall 12, which preferably lies above and within the bearing, FIG. 6. Preferably, no part of the retainer contacts any part of the bearing except the balls.

Each pocket 7 not only comprises the oppositely facing juxtaposed spherical surfaces 6 of the dividers 5, but also comprises the upwardly facing spherical surface 14 of the recess 13 which is notched into the upper portion of the ring 4, FIGS. 2, 4, 5 and 6. The surfaces 6 and 14 lie in the same sphere. The pockets 7 are equi-angularly disposed in the retainer. The spheres in which the surfaces 6 and 14 lie correspond to the spherically formed male portions of the forming die in which the retainers are molded. The spheres of the die and of the finished molded surfaces 6 and 14, given allowance for cooling and shrinking, are enough larger than the exterior surfaces of the balls which they respectively retain to permit freedom of movement of the balls 2 therein in the assembled bearing, not inconsistent, however, with releasably retaining the balls in the retainer when the latter is removed from the bearing as in FIGS. 2, 3 and 4.

The exposed circular peripheral edges 8 of the spherical pocket surfaces 6 are circular and, as suggested above, are struck from centers which lie in the surfaces 6 where they are intersected by the great circle described by the centers of the spheres comprising the surfaces 6 and 14. This is substantially the same great circle defined by the centers of the retained balls 2, depending on the closeness of the fit of the balls in the pockets. It follows that the more nearly the diameter of the circles of the edges 8 approaches the diameter of the balls 2, the more fully will the balls be enveloped in the pockets 7 and the more will the edges 8 be required to be deflected to admit the insertion and removal of the balls to and from the pockets. Similarly, the more fully the balls are pocketed the less ball surface can be engaged by the races. Therefore, I restrict the size of the circular edges 8 to expose plenty of ball surface for desirable unobstructed engagement with the tori of the races and to facilitate insertion and removal of the balls to and from the pockets. On the other hand the circles of the edges 8, i.e. the areas of the surfaces 6, are kept large enough to retain the balls in the pockets and to retain the retainer correctly in the bearing, see FIGS. 5 and 6.

The best size of the edges 8 relative to the balls 2 is also concerned with the flexibility of the edges, the feathering thereof and the material of which the dividers are made. As shown most clearly in FIGS. 4, 5 and 6 each of the dividers has a deep, sharp, median groove or cleft 15 approximately coextensive with the edges 8 and providing tapered support for and feathering of the edges whereby to give yielding resilience to the edges 8 and the stock of the dividers adjacent thereto, and, therefore, to the pockets 7 in respect to the reception and retention of the balls 2, regard being had for the material of which the retainer is made.

Presently, I prefer to mold the retainers of nylon, which I have found quite satisfactory for the purposes of my invention by virtue of its flexibility, yielding resilient strength, the facility with which it can be molded and its low friction value in sliding engagement with the balls in the pockets. Nylon is also desirable for the uses and purposes of my invention because of its impact strength, predictable shrinkage after molding, known moisture absorption and probable growth therefrom and its ability to preserve its form and strength in a bearing running as hot as about 350° F. Because of its moisture absorbent proclivity I prefer to assemble my nylon retainers when freshly molded into their bearings with all the balls in all the pockets, and then dunk the assembly in hot oil, below 350° F., for a short time. This tends to "adjust" and/or shrink the pockets to the proper desired ultimate clearance around the balls, and also to seal the exterior surfaces of the nylon against deleterious moisture absorption at any later date.

I have also used two other plastics with satisfaction, both, however not quite as heat resistant as nylon; both tending to be safe only below about 320° F., and both having less moisture pick-up then nylon with, however, a little less flexibility than nylon. One of these materials is sold under the trademark Celcon by Celanese Corporation of America, and is described by it as an acetal copolymer resin and described in Zimmerman and Levine's Handbook of Material Trade Names as an ethyl cellulose thermoplastic having high impact strength at very low temperatures. The other material is Du Pont's Delrin, said by it to be an acetal resin.

In view of the several considerations as to forms and sizes suggested above, I prefer that the diameters of the circles of the edges 8 may vary from 60 to 80 percent of the diameter of the balls to be retained in the pockets. In other respects, I have found it satisfactory to proportion the parts of the retainer in respect to the size of the balls to be retained approximately as shown in the drawings, again having regard for the known properties of the material employed in the retainer and the necessity and convenience of employing particular forms of retainers with particular bearings of different sizes and shapes. It follows that the depth and thickness of the ring 4 after the notches 13 have been molded therein must be sufficiently stout to hold the balls as a retainer and sufficiently small to avoid deleterious contact or interference with the bearings or the races thereof or of other instrumentalities with which the bearings are intended to be employed. The radial and axial measurements of the dividers 5 should prudently conform to the pockets and edges described above. The number of pockets in the retainer may be increased or decreased reasonably by varying the circumferential thickness of the dividers from that suggested in the drawings. It is my teaching, however, to retain the characteristic yielding of the portion of the margin of the pockets at and near the edges 8 as by increasing the circumferential width of the roots of clefts 15 if the dividers are to be thickened substantially. I prefer that the dividers be sufficiently thick to inhibit deleterious bending or fracture upon the insertion or removal of balls therebetween. It is also prudent and desirable that the dividers have a sufficient resilient strength to endure the travail of being forcibly stripped from the multi-spherical male parts of the mold about which the spherical surfaces 6 and 14 are formed; the stripping being conveniently performed by axial force and motion whereby to move the retainer downwardly as viewed in FIG. 1 and rightwardly as viewed in FIG. 4. Flattened shoulders 16 at the outward termini of the roots of the clefts 15, see FIGS. 1 and 4, comprise suitable places for ejector pins to bear upon and forcibly engage the ring portion of the retainer adjacent each of the dividers to affect the forcible ejection of the retainers from the mold and the stripping of the pocket portions of the dividers from the spherical parts of the die.

For further and more particular illustration of my invention, illustrative relative dimensions of commercial embodiments are these: A retainer for 9 balls of 7/16" diameter will have its great circle of the centers of the balls at 1.4265" diameter, its maximum outside diameter no more than 1.716", its minimum inside diameter at the inner edges of the pockets no less than 1.136", its overall axial length no more than 0.456", and the spherical diameter of the pockets no less than about 0.454". A retainer for 14 balls of 5/16" diameter will have its great circle of the centers of the balls at 1.789" diameter, its maximum outside diameter no more than 1.997", its minimum inside diameter at the inner edges of the pockets no less than 1.581", its overall axial length no more than 0.301" and the spherical diameter of the pockets no less than about 0.324". A retainer for 11 balls of ½" diameter will have its great circle of the centers of the balls at 2.092" diameter, its maximum outside diameter no more than 2.424", its minimum inside diameter at the inner edges of the pockets no less than 1.760", its overall length no more than 0.509" and the spherical diameter of the pockets no less than about 0.520".

While I have illustrated and described a preferred form and embodiment of my invention, modifications, changes and improvements will occur to those skilled in the art who come to understand and enjoy the principles and precepts thereof. Therefore, the scope of my patent should not be limited to the specific form of my invention herein particularly illustrated and described nor in any other manner inconsistent with the progress by which my invention has promoted the art.

I claim:

1. A retainer for ball bearings comprising a unitary, molded plastic structure having an axis and an unyielding annular base portion normal to said axis and about half as thick as the balls to be retained and having cylindrical side walls and an end wall and having hemispheric recesses each of radius slightly greater than the ball to be retained therein and notched in said base and opening axially away from said end wall, each said recess having an axial depth in the base appreciably greater than the radius of the said ball to be retained, said retainer also comprising dividers disposed between each adjacent pair of said recesses extending axially therebeyond and extending radially more widely than said base portion, adjacent pairs of said dividers having opposed, spherical, concave faces coincident with and in spherical extension of each recess and defining therewith an incomplete spherical ball retaining pocket of slightly larger size than the ball to be retained therein, said faces having continuous, circular, feathered edges struck from and normal to the great circle of the centers of said pockets and extending around from the inner wall to the outer wall of said base portion for more than 180° around said great circle, pairs of said concave faces capping opposite poles of balls to be retained therebetween at the intersection of said great circle with said faces and preventing inadvertent displacement from each pocket of each ball to be retained in each pocket, the diameter of said circular edges being greater than the thickness of said base portion and between about 60 to 80 percent of the diameter of the balls to be retained, each divider having a pair of said faces back-to-back with tapered resilient support for said feathered edges forming an arcuate V-shaped groove in each divider between the edges of the back-to-back faces, the root of each groove being spaced from said great circle, said edges being resiliently displaceable and admitting insertion and removal of balls to and from said pockets by forcible motion transverse to said great circle, each divider being intersected by said great circle and being solid and strong adjacent said great circle and being unyielding to compressive forces exerted by retained balls in the direction of said great circle.

2. A retainer for ball bearings comprising a unitary, molded plastic structure having an axis and an unyielding annular base portion normal to said axis and about half as thick as the balls to be retained and having an end wall and hemispheric recesses notched in said base and opening axially away from said end wall, each said recess having a radius slightly greater than that of the ball to be retained therein, said retainer also comprising dividers between each adjacent pair of said recesses extending axially away from said end wall, adjacent pairs of said dividers having opposed spherical, concave, faces coincident with and in spherical extension of each recess and defining a pocket of slightly larger size than the ball to be retained therein, said faces having continuous, external circular edges struck from the great circle of the centers of said pockets and extending for more than 180° around said great circle and preventing inadvertent displacement from each pocket of each ball to be retained therein, the diameter of said circular edges being between about 60 to 80 percent of the diameter of the balls to be retained, each divider having a pair of said faces back-to-back with tapered resilient support for said edges and each divider being solid and unyielding to compressive forces exerted by retained balls in the direction of said great circle.

References Cited by the Examiner
UNITED STATES PATENTS

| | | | |
|---|---|---|---|
| 2,407,388 | 9/46 | Smith | 308—201 |
| 2,458,762 | 1/49 | Barnbrook | 308—201 |

FOREIGN PATENTS

| | | |
|---|---|---|
| 993,520 | 7/51 | France. |
| 1,204,966 | 8/59 | France. |
| 660,911 | 6/38 | Germany. |
| 739,333 | 10/55 | Great Britain. |
| 833,847 | 5/60 | Great Britain. |

FRANK SUSKO, *Primary Examiner*.

ROBERT C. RIORDON, *Examiner*.